United States Patent
Nguyen et al.

(10) Patent No.: US 10,904,725 B2
(45) Date of Patent: Jan. 26, 2021

(54) ENHANCED PHYSICAL LAYER PERFORMANCE BY INTER-SERVICE INFORMATION

(71) Applicant: QUALCOMM Incorporated, San Diego, CA (US)

(72) Inventors: Tien Viet Nguyen, Bridgewater, NJ (US); Sudhir Kumar Baghel, Hillsborough, NJ (US); Kapil Gulati, Dover, DE (US); Shailesh Patil, San Diego, CA (US); Libin Jiang, Bridgewater, NJ (US); Zhibin Wu, Bedminster, NJ (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/243,820

(22) Filed: Jan. 9, 2019

(65) Prior Publication Data
US 2019/0222985 A1 Jul. 18, 2019

Related U.S. Application Data

(60) Provisional application No. 62/616,548, filed on Jan. 12, 2018.

(51) Int. Cl.
*H04W 4/44* (2018.01)
*H04B 7/00* (2006.01)
(Continued)

(52) U.S. Cl.
CPC ............... *H04W 4/44* (2018.02); *H04B 7/00* (2013.01); *H04B 7/0413* (2013.01);
(Continued)

(58) Field of Classification Search
CPC .. H04W 4/027; H04W 72/048; H04B 7/0689; H04B 7/0413; H04L 1/0006; H04L 5/0051; H04L 12/1845
See application file for complete search history.

(56) References Cited

U.S. PATENT DOCUMENTS

2017/0048905 A1* 2/2017 Yun ...................... H04L 5/0048
2017/0273128 A1 9/2017 Abedini et al.
(Continued)

FOREIGN PATENT DOCUMENTS

KR 20170020697 A 2/2017
WO WO-2017095187 A1 6/2017

OTHER PUBLICATIONS

International Search Report and Written Opinion—PCT/US2019/013087—ISA/EPO—dated Apr. 30, 2019.

*Primary Examiner* — Omer S Mian
(74) *Attorney, Agent, or Firm* — Patterson & Sheridan, L.L.P

(57) ABSTRACT

In an example, a method for wireless communications by a first wireless device, is disclosed comprising obtaining information regarding an environment for wireless communications between the first wireless device and at least one second wireless device and adjusting one or more operating parameters for the wireless communications, based on the information. As described herein, information from one service or application in a first RAT is used by the first wireless device to enhance performance in another service or application in a second RAT by the first wireless device.

24 Claims, 9 Drawing Sheets

(51) Int. Cl.
*H04B 7/0413* (2017.01)
*H04B 7/06* (2006.01)
*H04L 5/00* (2006.01)
*H04L 12/18* (2006.01)
*H04L 12/24* (2006.01)
*H04W 4/02* (2018.01)
*H04W 72/02* (2009.01)
*H04W 72/04* (2009.01)

(52) U.S. Cl.
CPC ......... *H04B 7/0689* (2013.01); *H04L 5/0037* (2013.01); *H04L 5/0048* (2013.01); *H04L 5/0051* (2013.01); *H04L 12/1845* (2013.01); *H04L 41/0816* (2013.01); *H04W 4/023* (2013.01); *H04W 72/02* (2013.01); *H04W 72/048* (2013.01)

(56) References Cited

U.S. PATENT DOCUMENTS

| | | | | |
|---|---|---|---|---|
| 2017/0288806 | A1* | 10/2017 | Blasco Serrano | H04W 4/70 |
| 2018/0234973 | A1* | 8/2018 | Lee | H04W 72/0446 |
| 2019/0150082 | A1* | 5/2019 | Kedalagudde | G08G 1/22 |
| 2019/0260623 | A1* | 8/2019 | Li | H04L 27/2627 |

* cited by examiner

ENHANCED PHYSICAL LAYER PERFORMANCE BY INTER-SERVICE INFORMATION

CROSS-REFERENCE TO RELATED APPLICATIONS

This application claims benefit of U.S. Provisional Patent Application Ser. No. 62/616,548 filed Jan. 12, 2018, entitled "Enhanced Physical Layer Performance By Inter-Service Information" which is expressly incorporated herein by reference in its entirety.

FIELD OF THE DISCLOSURE

Certain aspects of the present disclosure generally relate to wireless communications and, more particularly, to methods and apparatus for use of additional reference signals in vehicle-to-everything (V2X) communications systems.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

Vehicle to everything communications seek to enable vehicles to communicate with one another to provide a host of services, including vehicle to vehicle communications (V2V), vehicle to infrastructure (V2I) communications, vehicle to grid (V2G) communications and vehicle to people (V2P) communications. Conventional wireless communication relies on network configuring essential physical layer parameter (number of antenna port, number of MIMO layer, MCS, etc.) at a relative slow time scale. Given the high mobility of cars, and the lack of network infrastructure in V2X applications, a more dynamic, autonomous framework should be designed to allow vehicular devices to configure itself with such essential parameters using its own perceived input and the information received from other devices.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Certain aspects of the present disclosure provide a method for wireless communications by a first wireless device. The method includes obtaining information regarding an environment for wireless communications between the first wireless device and at least a second wireless device and adjusting one or more operating parameters for the wireless communications, based on the information.

Certain aspects of the present disclosure provide an apparatus for wireless communications by a first wireless device. The apparatus includes means for obtaining information regarding an environment for wireless communications between the first wireless device and at least a second wireless device and means for adjusting one or more operating parameters for the wireless communications, based on the information.

Certain aspects of the present disclosure provide an apparatus for wireless communications by a first wireless device. The apparatus includes at least one processor and a memory coupled to the at least one processor. The at least one processor is configured to obtain information regarding an environment for wireless communications between the first wireless device and at least a second wireless device and adjust one or more operating parameters for the wireless communications, based on the information.

Certain aspects of the present disclosure provide a computer readable medium for wireless communications by a first wireless device comprising instructions configured to obtain information regarding an environment for wireless communications between the first wireless device and at least a second wireless device and adjust one or more operating parameters for the wireless communications, based on the information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
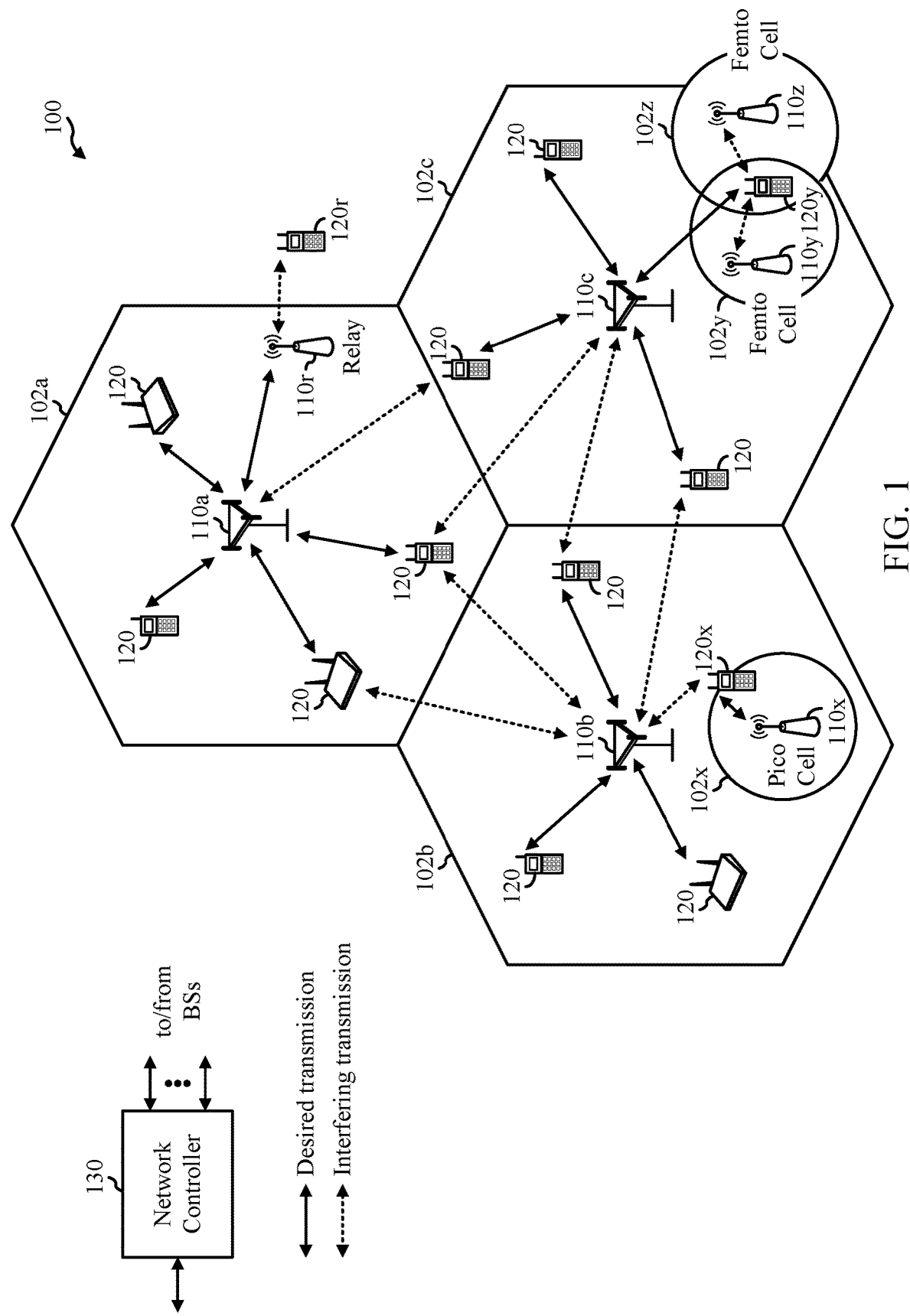
FIG. 1 is a block diagram conceptually illustrating an example telecommunications system, in accordance with certain aspects of the present disclosure.

Aspects of the present disclosure provide apparatus, methods, processing systems, and computer readable mediums for inter-service, which may be referred to as inter-application, information sharing. Different services or applications may be associated with different RATs that operate in a certain frequency portion of a radio frequency spectrum.

A UE or vehicle may be configured to simultaneously operate in a first RAT and a second RAT. Each RAT may offer services or applications. As described herein, information from one service or application in a first RAT is used by a vehicle to enhance performance in another service or application in a second RAT.

In conventional wireless communication systems, different services are treated independently at lower network layers (MAC and PHY layers) of a protocol stack. Services may refer to, for example, voice, video, cooperative awareness, sensor sharing, platooning, and positioning. Additionally, in conventional wireless communication systems, certain lower network layer parameters such as MCS, the number of antenna ports to use for transmission or reception, the number of multiplexed spatial layers, reference signal patterns, and/or transmit power are set based, at least in part, by the network. For example, a UE may measure a channel quality or reference signal receive power and report the measurements to the network. The network may transmit an indication of one or more parameters for the UE to use for transmission or reception.

Vehicle-to-everything (V2X) and vehicle-to-vehicle (V2V) communication differ from traditional communication systems such as LTE. V2V is a type of V2X communication. In V2X communication, vehicles or subordinate entities communicate directly with each other. In V2V communication, basic safety information is transmitted, wherein a first vehicle wirelessly transmits information about its speed, location, and/or direction. The basic safety information allows a first vehicle to broadcast and receive omnidirectional messages to gain awareness of other vehicles in the first vehicle's proximity. Accordingly, V2V capable vehicles use the messages from surrounding vehicles to learn about the physical environment, including potential safety threats, as they develop.

Each vehicle is aware of its speed, location, and direction. Based on V2V communication, the vehicle is also aware of the speed, location, and direction of other vehicles in the proximity of the vehicle. As described herein, the vehicle may autonomously determine certain transmission and reception parameters (e.g., without communicating with the network) and the information it wants to receive from other vehicles. Additionally, the vehicle may leverage information from one service in a first RAT to enhance perform of another service in a second RAT. In one example, the first RAT is an LTE V2X or LTE V2V communication system and the second RAT is a NR V2X or V2V communication system. The aspects described herein may reduce V2V or V2X overhead while enhancing road safety and a user's driving experience.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

NR introduces the concept of network slicing. For example, a network may have multiple slices, which may support different services, for example, internet of everything (IoE), URLLC, eMBB, vehicle-to-vehicle (V2V) communications, etc. A slice may be defined as a complete logical network that comprises of a set of network functions and corresponding resources necessary to provide certain network capabilities and network characteristics.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies, such as a 5G nextgen/NR network.

Example Wireless Communications System

FIG. 1 illustrates an example wireless network 100, such as a new radio (NR) or 5G network, in which aspects of the present disclosure may be performed. In an example, a vehicle may have operate in a LTE V2V and NR V2V system, wherein certain services use or go through LTE and other services use or go through NR. As described herein, the vehicle uses information obtained from one service to configure parameters and increase throughput in another service. The inter-service sharing at lower layers is not present in conventional wireless system. Further, in conventional wireless communication systems, the network is involved in configuring these parameters for a UE. As described herein, vehicles determine parameters based on their wireless environment.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed, employing a multi-slice network architecture.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110*c* may be macro BSs for the macro cells 102*a*, 102*b* and 102*c*, respectively. The BS 110*x* may be a pico BS for a pico cell 102*x*. The BSs 110*y* and 110*z* may be femto BS for the femto cells 102*y* and 102*z*, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120*x*, 120*y*, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Aspects of the disclosure relate to apparatus, methods, processing systems, and computer readable mediums related to new radio V2X (NR V2X) systems as non-limiting examples. Other aspects may be applicable, for example, to LTE-V2X technologies, as a non-limiting example. NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a radio access network (RAN) may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
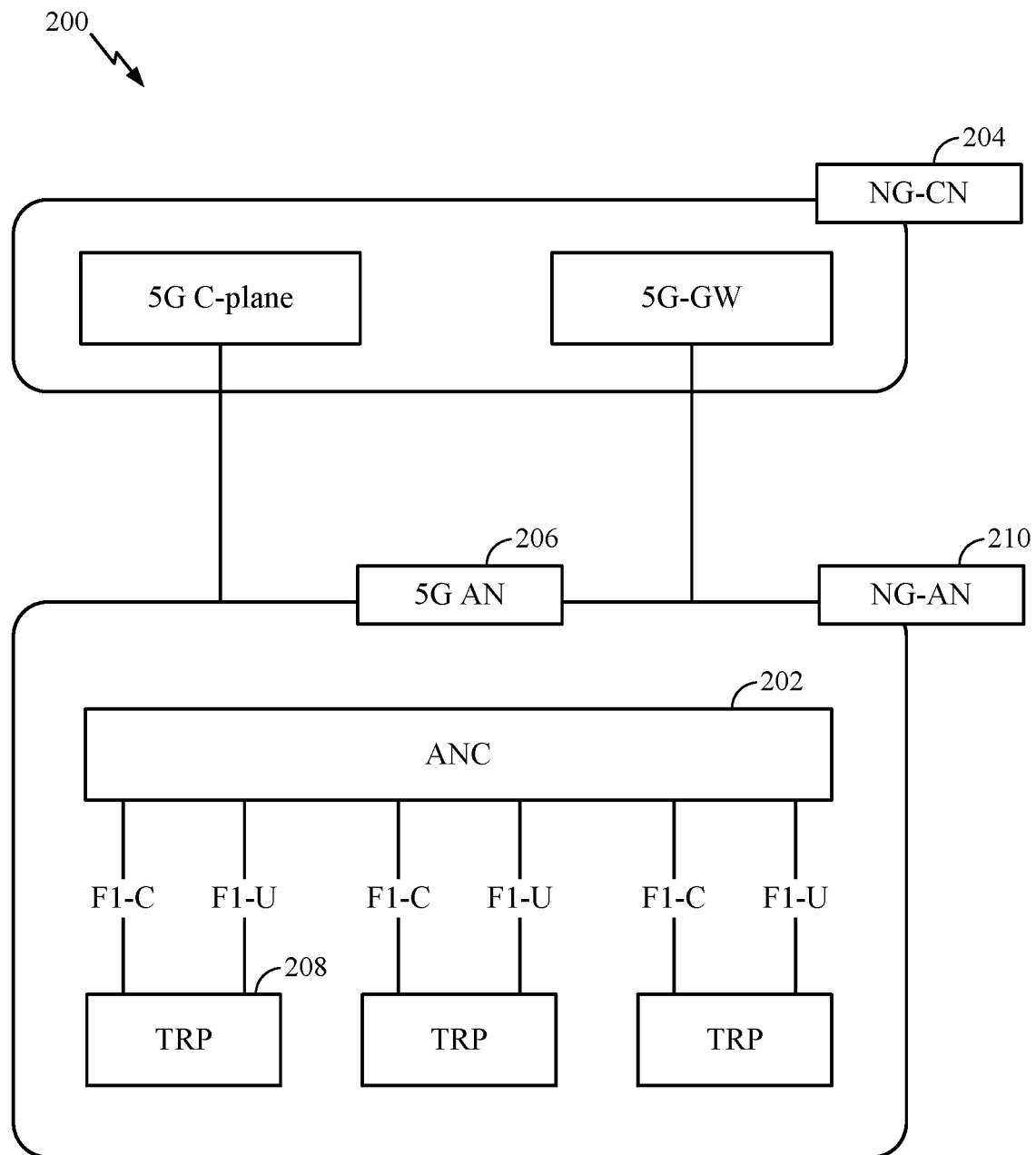
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
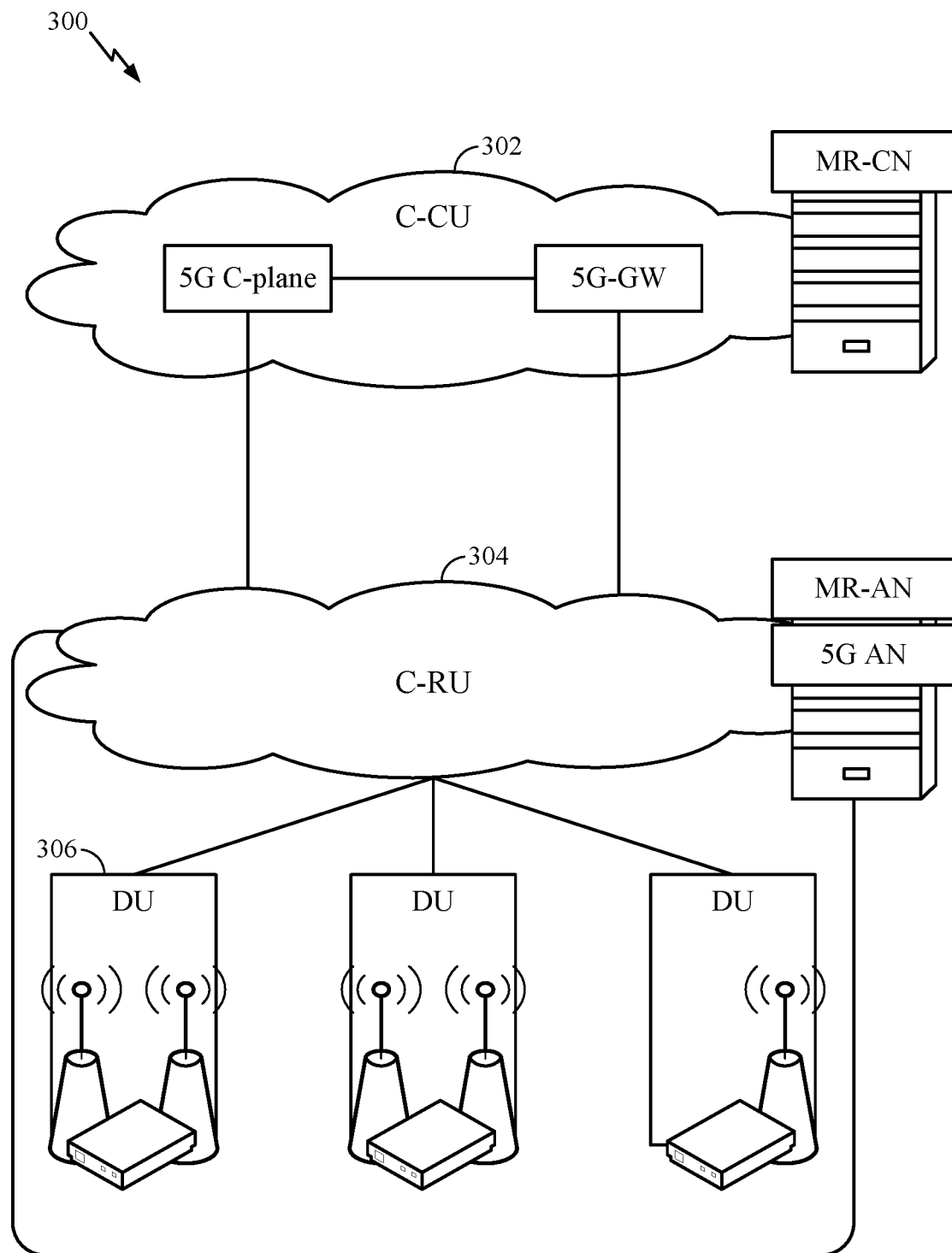
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
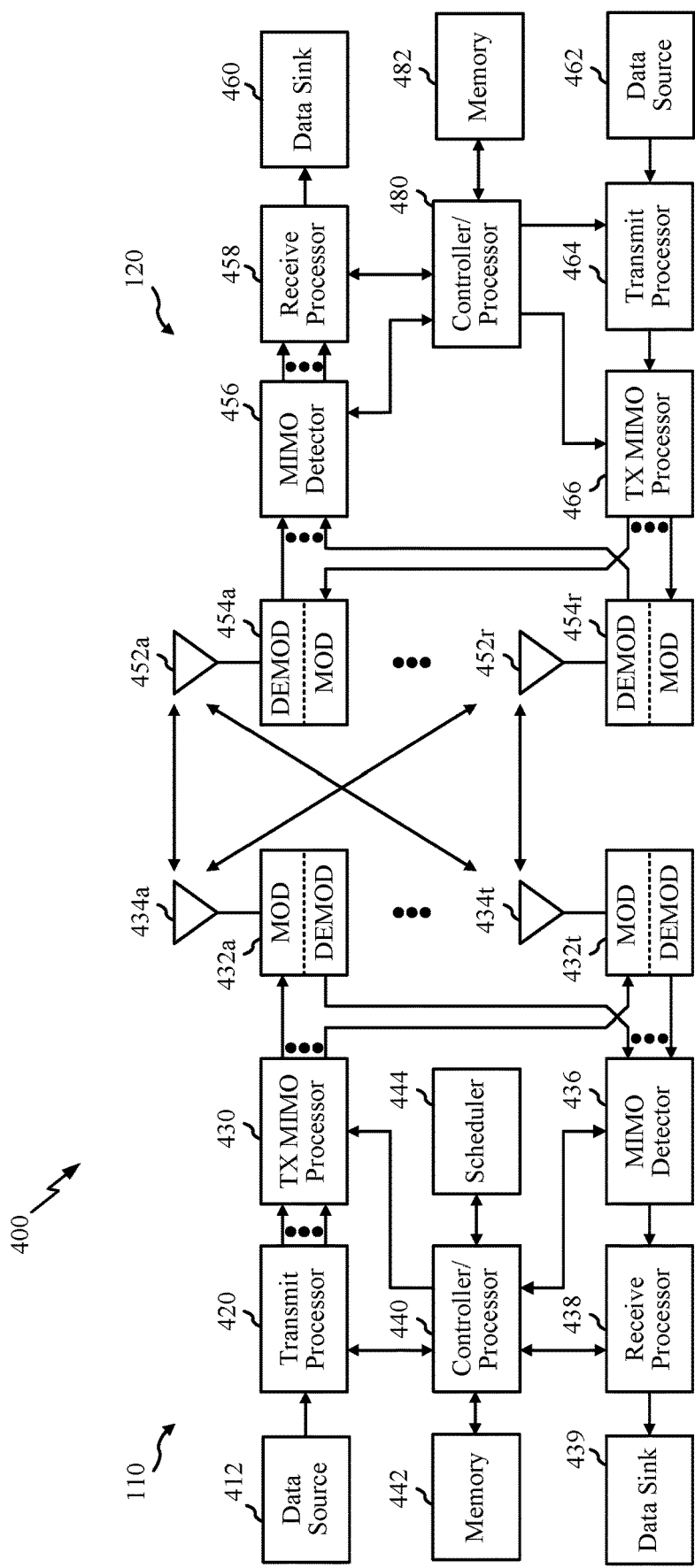
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, Tx/Rx 432, processors 420, 430, 438, and/or controller/processor 440 of the BS 110 may be used to perform the operations described herein and illustrated with reference to FIGS. 9-10. In an example, the UE 120 comprises a vehicle configured for V2X operations. The antennas 452, Tx/Rx 454, processors 466, 458, 464, and/or controller/processor 480 of the vehicle perform the operations described herein. In an example, these components obtain information regarding an environment for wireless communications between the vehicle and at least a second wireless device, such as another vehicle and adjust one or more operating parameters for a transmission or a group of transmissions based on the information. In aspects, the transmissions are V2V transmissions. In aspects, information is obtained by the vehicle using a first service and parameters are adjusted for a second service. In aspects, the first and second services operate in different RANs.

According to aspects, for a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 480 and/or other processors and modules at the UE 120 which may be a vehicle may perform or direct, e.g., the execution of the functional blocks illustrated in FIG. 9, and/or other processes for the techniques described herein. The memories 442 and 482 may store data and program codes for the BS 110 and the UE 120, respectively. A scheduler 444 may schedule UEs for data transmission on the downlink and/or uplink. In aspects, a scheduler at the vehicle schedules the UE's transmission and reception without network involvement. In aspects, the vehicle's transmission and reception is determined by the vehicle and implemented by the controller/processor 480.

Figure 5:
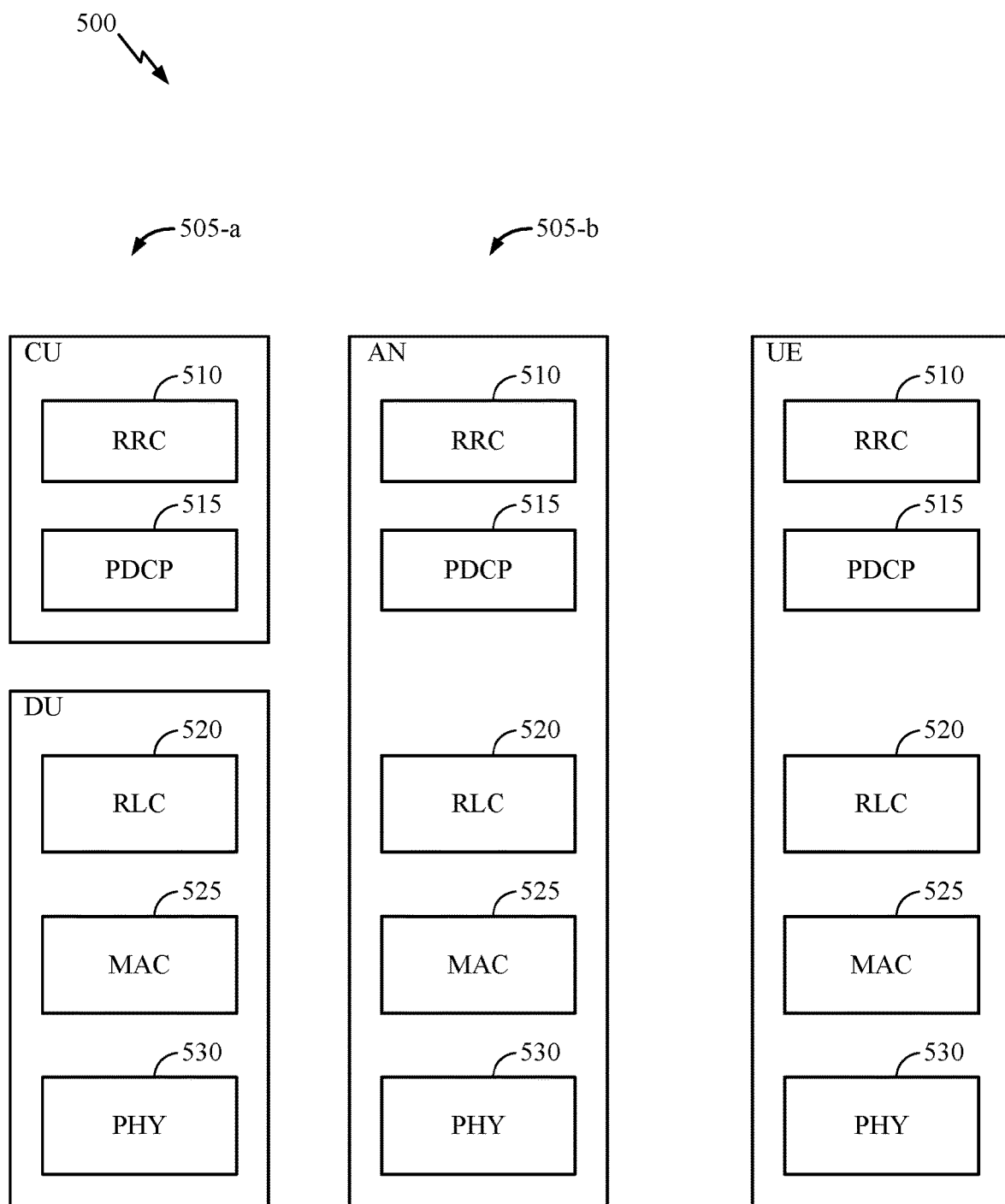
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
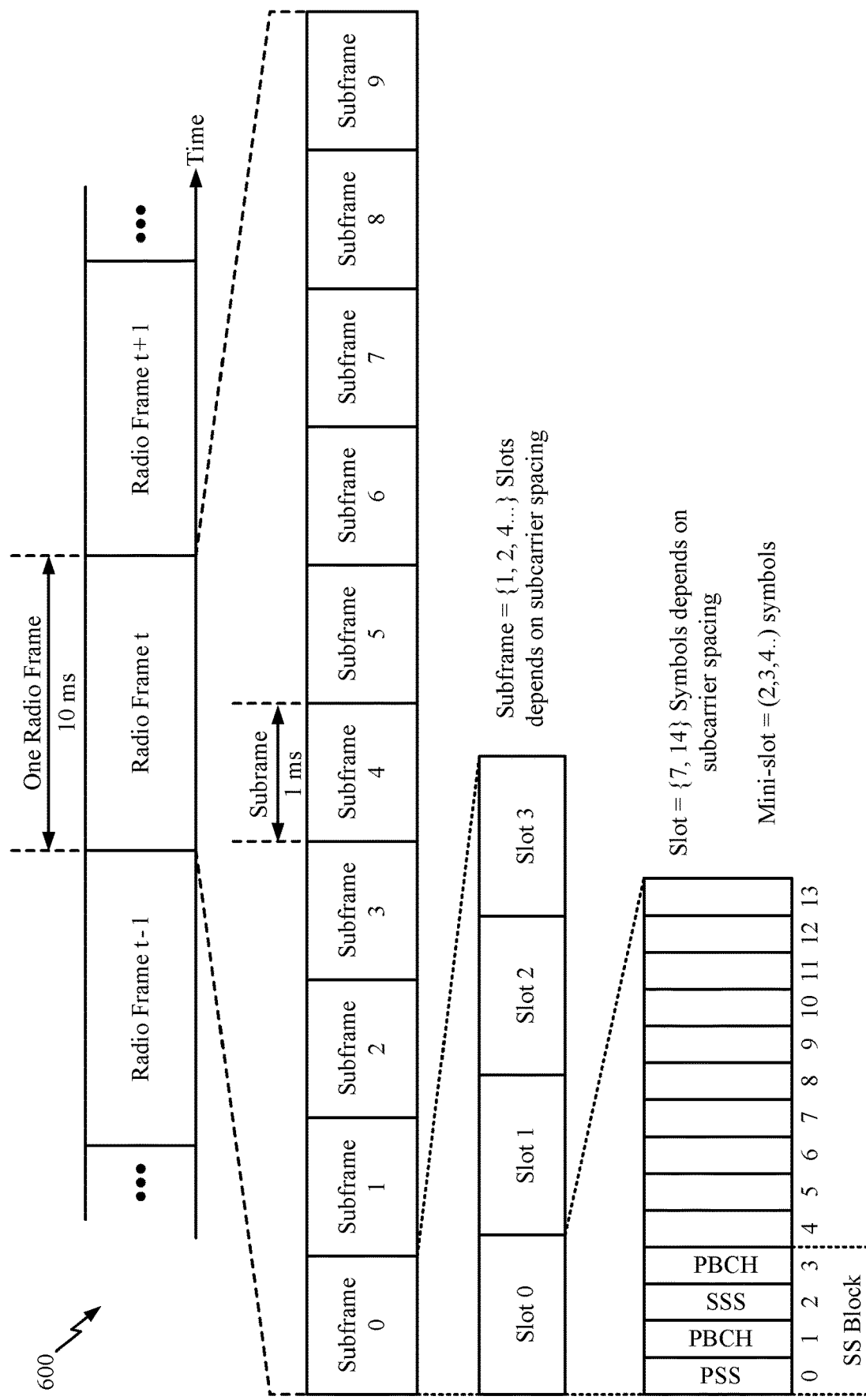
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. For example, one or more of the channels in an SS block may be used for measurements. Such measurements may be used for various purposes such as radio link management (RLM), beam management, etc. A UE may measure the cell quality and report the quality back in the form of a measurement report, which may be used by the base station for beam management and other purposes. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

LTE vehicle-to-everything (LTE-V2X) has been developed as a technology to address basic vehicular wireless communications to enhance road safety and the driving experience. In other systems, New Radio vehicle-to-everything (NR-V2X) has been developed as an additional technology that covers more advanced communication use case to further enhance road safety and driving experience. Non-limiting embodiments for frequencies covered may be, for example, 3 GHz to 5 GHz. As described below, V2X system methods and apparatus may be applicable to both LTE-V2X and NR-V2X as well as other frequencies. Thus, frequency spectrums other than those covered by LTE-V2X and NR-V2X are also considered to be applicable to the description and as such, the disclosure should not be considered limiting.

Figure 8:
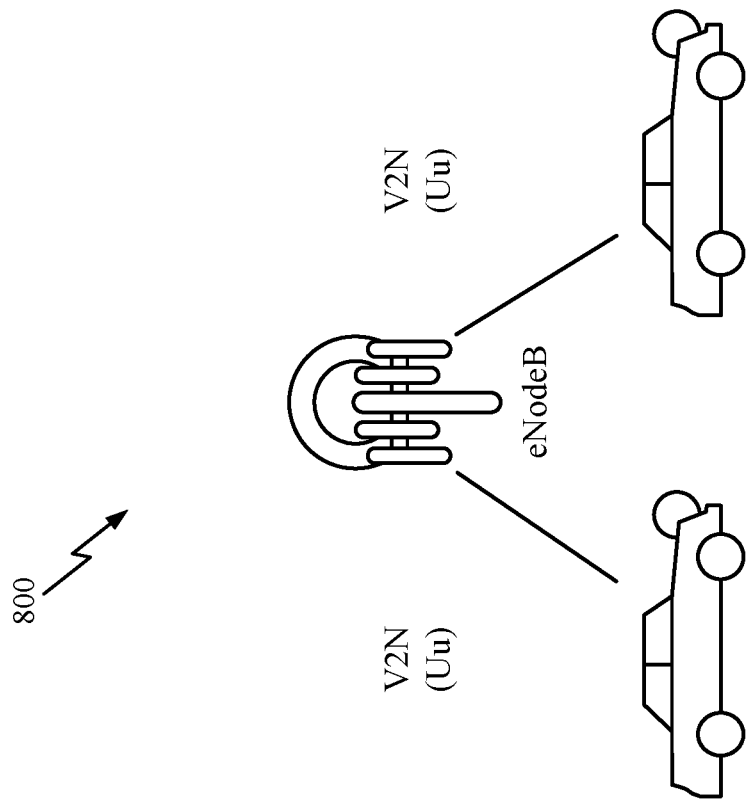
FIG. 8 illustrates a V2X system with network communication between vehicles in accordance with aspects of the present disclosure.
Figure 7:
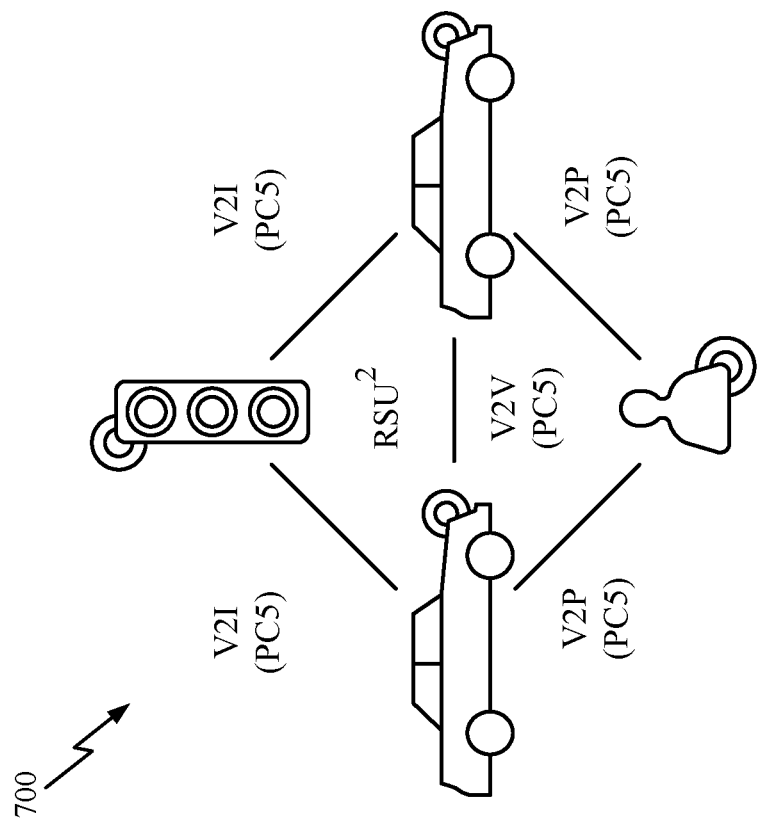
FIG. 7 illustrates a V2X system with direct communication between vehicles in accordance with aspects of the present disclosure.

The V2X system, provided in FIGS. 7 and 8 provides two complementary transmission modes. A first transmission mode involves direct communications between participants in the local area. Such communications are illustrated in FIG. 7. A second transmission mode involves network communications through a network 800 as illustrated in FIG. 8.

Referring to FIG. 7, the first transmission mode 700 allows for direct communication between different participants in a given geographic location. As illustrated, a vehicle can have a communication with an individual (V2P) through a PC5 interface. Communications between a vehicle and another vehicle (V2V) may also occur through a PC5 interface. In a like manner, communication may occur from a vehicle to other highway components, such as a signal (V2I) through a PC5 interface. In each embodiment illustrated, two-way communication can take place between elements, therefore each element may be a transmitter and a receiver of information. In the configuration provided, the first transmission mode is a self-managed system and no network assistance is provided. Such transmission modes provide for reduced cost and increased reliability as network service interruptions do not occur during handover operations for moving vehicles. Resource assignments do not need coordination between operators and subscription to a network is not necessary, therefore there is reduced complexity for such self-managed systems.

In one example, the V2X system is configured to work in a 5.9 GHz spectrum, thus any vehicle with an equipped system may access this common frequency and share information. Such harmonized/common spectrum operations allows for safe operation. V2X operations may also co-exist with 802.11p operations by being placed on different channels, thus existing 802.11p operations will not be disturbed by the introduction of V2X systems. In one example, the V2X system may be operated in a 10 MHz band that describes/contains basic safety services. In other non-limiting embodiments, the V2X system may support advanced safety services in addition to basic safety services described above. In another example, the V2X system may be used in a 5G NR V2X configuration, which is configured to interface with a wide variety of devices. By utilizing a 5G NR V2X configuration, multi Gbps rates for download and upload may be provided. In a V2X system that uses a 5G NR V2X configuration, latency is kept low, for example 1 ms, to enhance operation of the V2X system, even in challenging wireless environments.

Referring to FIG. 8, a second of two complementary transmission modes 800 is illustrated. In the illustrated embodiment, a vehicle may communicate to another vehicle through network communications. These network communications may occur through discrete nodes, such as eNodeB, that send and receive information between vehicles. The network communications may be used, for example, for long range communications between vehicles, such as noting the presence of an accident approximately 1 mile ahead. Other types of communication may be sent by the node to vehicles, such as traffic flow conditions, road hazard warnings, environmental/weather reports, service station availability and other like data. Data can be obtained from cloud-based sharing services.

For network communications, residential service units (RSUs) may be utilized as well as 4G/5G small cell communication technologies to benefit in more highly covered areas to allow real time information to be shared among V2X users. As the number of RSUs diminishes, the V2X systems may rely more on small cell communications, as necessary.

In either of the two complementary transmission modes illustrated in FIGS. 7 and 8, higher layers may be leveraged to tune congestion control parameters. In high density vehicle deployment areas, using higher layers for such functions provides an enhanced performance on lower layers due to congestion control for lower PHY/MAC layers.

The vehicle systems that use V2X technologies have significant advantages over 802.11p technologies. Conventional 802.11p technologies have limited scaling capabilities and access control can be problematic. In V2X technologies, two vehicles apart from one another may use the same resource without incident as there are no denied access requests. V2X technologies also have advantages over 802.11p technologies as these V2X technologies are designed to meet latency requirements, even for moving vehicles, thus allowing for scheduling and access to resources in a timely manner.

In the instance of a blind curve scenario, road conditions may play an integral part in decision making opportunities for vehicles. V2X communications can provide for significant safety of operators where stopping distance estimations may be performed on a vehicle by vehicle basis. These stopping distance estimations allow for traffic to flow around courses, such as a blind curve, with greater vehicle safety, while maximizing the travel speed and efficiency.

Enhanced Physical Layer Performance by Inter-Service Information

As described above, side link communication refers to two subordinate entities such as UEs or vehicles directly communicating with each other. In an example, in V2V communication, a first vehicle periodically transmits its location, speed, and/or trajectory information. One or more second vehicles receive this information and gains a better understanding of the environment. This helps to create a more stable road environment.

Moving forward, vehicles may be equipped with more advanced applications and services. For example, vehicles may be equipped with sensors and the vehicles may share information collected using sensors with each other. In an example, autonomously driven vehicles may use sensor data, speed, and/or trajectory information received from surrounding vehicles to gain physical environmental awareness. Some of these applications may require a high quality of service.

Aspects of the present disclosure leverage information determined by an application or service to enhance an application another application or service. In an example, a service can be sent over (performed using) a first RAT and a second RAT. A UE may leverage information provided by the service to configure both the first RAT and the second RAT. For illustrative purposes, the service may be a basic safety service or a cooperative awareness service. The first RAT may be LTE V2X and the second RAT may be NR V2X. Information from the basic safety service over LTE V2X can be used to enhance both LTE V2X and NR V2X. Other examples of services include platooning, sensor sharing (raw and processed data), cooperative maneuvering, and positioning. In an example, the first service is provided by a first RAT and information from the first service is used to enhance another service provided by a second RAT.

In typical wireless communication systems, services, such as voice and video, are treated independently in lower network layers (e.g., PHY/MAC layers). The services, such as voice and video, may communicate with each other at the PHY and MAC layers so voice is synchronized with video; however, currents methods do not leverage information obtained in a first service in a first RAT to enhance a service in a second, different RAT.

According to aspects of the present disclosure, information from a service in a first RAT is leveraged to configure parameters for the first RAT as well as a second, different RAT. Information from a service in the first RAT is used to better serve services in the second RAT, thereby enhancing an application in a second RAT. In an example, the service in the first RAT may be basic safety service or cooperative awareness services. In an example, a vehicle may operate in two different technologies or RATs: LTE V2X and NR V2X. The first RAT may be LTE V2X and the second RAT may be NR V2X. LTE V2X may perform a first set of applications and NR V2X may perform a second set of applications. As described herein, information from LTE V2X applications may be used to enhance NR V2X applications. In an example, services such as platooning, sensor sharing (raw and processing data), cooperative maneuvering, and accurate positioning may be services in the send RAT (NR V2X).

In aspects, V2X operating parameters are adjusted based on an inter-service information exchange (e.g., an exchange between a first service in LTE with another service in NR at the physical and/or MAC layers). Such inter-service information exchange may be fundamentally different from conventional wireless communications where different services are treated independently in the different network layers and further where services in a first RAT do not share information with services in a second RAT. The inter-service approach may be suitable for V2X, since PHY/MAC parameters (e.g., MCS, the number of antenna ports used for transmission and/or reception, the number of multiplexed spatial layers, RS patterns, and transmit power) may be set autonomously for each vehicle based on the exchanged information and vehicle capability, instead of being controlled by the network. Due to the lack of central network control, the inter-service approach allows each vehicle to flexibly manage parameters based on its wireless environment. As described below, this reduces overhead resources used by vehicles.

In some cases, reference signal patterns may be adjusted based on vehicle speed or relative speed with another device. Two vehicles moving with different speeds in the same direction have a relative speed that is equal to the difference of their speeds. Two vehicles moving in opposite directions have a relative speed equal to the sum of their speeds.

A vehicle is aware of its speed and receives information indicative of a second vehicle's speed and optionally direction in LTE V2X basic safety transmissions. According to aspects, the vehicle uses the received speed and optional direction information of the second vehicle to determine a reference signal pattern for transmission. Therefore, a type of reference signals and a time-frequency density of reference signals may be transmitted according to various parameters, such the transmitting vehicle's speed or relative vehicle speed between two vehicles. The type of reference signal refers to, for example, the number of antenna ports used for RS transmission or a number of spatial layers used for RS transmission.

According to aspects, different reference signal patterns may be used, each pattern corresponding to a different vehicle speed or relative speed. According to aspects, a maximum relative speed supported is 500 km/h (250 km/h opposite direction) at a frequency of 6 GHz.

A first RS pattern (e.g., time frequency pattern) is a "normal" pattern that supports low relative speed between two vehicles (all modulation up to 256 QAM) and low MCS at moderately high speed of the transmitting vehicle. In an example, the reference signal density in the time domain is 1 RS transmitted in every 8 OFDM symbols.

A second pattern has 1 RS transmitted in every 4 OFDM symbols. This second pattern is used to support high speed of the transmitting vehicle (up to 280 km/h relative speed) and higher MCS (up to 64 quadrature amplitude modulation) compared to the first pattern.

A third pattern has 1 RS transmitted in every 2 OFDM symbols. The third pattern is used to support higher (up to 500 km/hr) vehicle speeds than the first and second patterns. A large amount of RS overhead is needed to support the very high vehicle speed of the third pattern, therefore, it is desirable that the third pattern is based on actual or estimated vehicle speeds and actual or estimated relative speeds between the transmitter and receiver such that the high overhead is only used when needed. At lower transmitter speeds or relative speeds, the RS pattern may switch from the third pattern to the second pattern or the first pattern to prevent to reduce excess resource consumption and therefore to reduce RS overhead.

V2X traffic has high volume and location dependent traffic. This is similar to multi-cast transmissions; however, in V2X communications, the set of receivers is not predetermined. In V2X communications, the set of receivers is determined in real time based transmitted data, and receivers decide if they want to receive a particular type of information. In an aspect, a bit indicates the type of information transmitted in a V2X transmission and each receiver decides based on the bit, if it wants to receive the information or not. In an example, each vehicle receiver determines, based on its location and movement information, whether it wants to receive specific information. According to aspects, the receiver transmits a physical layer negative acknowledgement (NACK) if the receiver cannot decode the data for a packet that the receiver wants to trigger a retransmission from the transmitting vehicle. From a transmitter perspective, the vehicle does not know the intended receiver.

As seen in the above description, location and movement information including speed of vehicles in a V2V communication environment is used to determine transmitting parameters and what information a vehicle will receive. Location and movement information may also be used to turn certain features on or off. Therefore, location and movement information is needed at lower network layers such as a PHY and MAC layer for different services. This information is already available at the application layer of different services. For example, the vehicle's own speed and location is known at the application layer using GPS services, inertial sensor, or location engine services. Surrounding vehicle speed and location (LOS) is known at the application sensor using ranging sensor (radar, Lidar) or a camera. Surrounding vehicles speed and location (NLOS) is known at an application layer using basic safety service (Basic Safety Message (BSM), Cooperative Awareness Message (CAM), or Decentralized Environmental Notification Message (DEMN messages). According to aspects, a vehicle leverages information from one service to adjust parameters for another service.

The role of the network in V2X communications, when it is presented to a vehicle, is to facilitate the above process at each vehicle by setting the set of all possible PHY/MAC parameters for different scenarios. In one non-limiting example, the setting of the PHY/MAC parameters may be performed via RRC signaling. The V2X network may perform this function, as the network has global information about network topology, vehicle density, speed range, etc. In an example, reference signal patterns may be set. In an urban scenario, where there may be an abundance of slow moving vehicle traffic, the network may configure the reference signal pattern one (1) to be the only possible pattern (the supported speed is slow, also lower reference signal overhead allows better spectral efficiency,). In contrast, for a highway scenario, the network can configure several (e.g., the first, second, and third RS pattern) possible reference signal patterns to support high speeds. Thus, the network may limit the vehicles options for adjusting parameters, such as, for example, indicated a limited set of RS patterns available for use by the vehicle.

An additional problem to be addressed is that the PHY/MAC parameters should be transparent between the transmitter and the receiver to enable receiving information from other services. This information includes, but is not limited to, a number for an antenna port, MCS, reference signal patterns, etc. In conventional networks, most of these parameters are set via a combination of RRC configuring for the semi-static one (number of antenna port, RX patterns, etc.) and physical control channel (MCS, etc.). This is possible because the communication is between the network and the UE. For V2X, since the communication is directly between vehicles, those parameters are communicated over the control channel only. Another reason for this is the high mobility of vehicular UEs, which make the used PHY/MAC parameters change more dynamically.

According to aspects of the present disclosure, a network may support different services, for example, internet of everything (IoE), URLLC, eMBB, vehicular communications (i.e., V2X such as vehicle-to-vehicle (V2V), vehicle-to-infrastructure (V2I), vehicle-to-pedestrian (V2P), vehicle-to-network (V2N)), etc.

Figure 9:
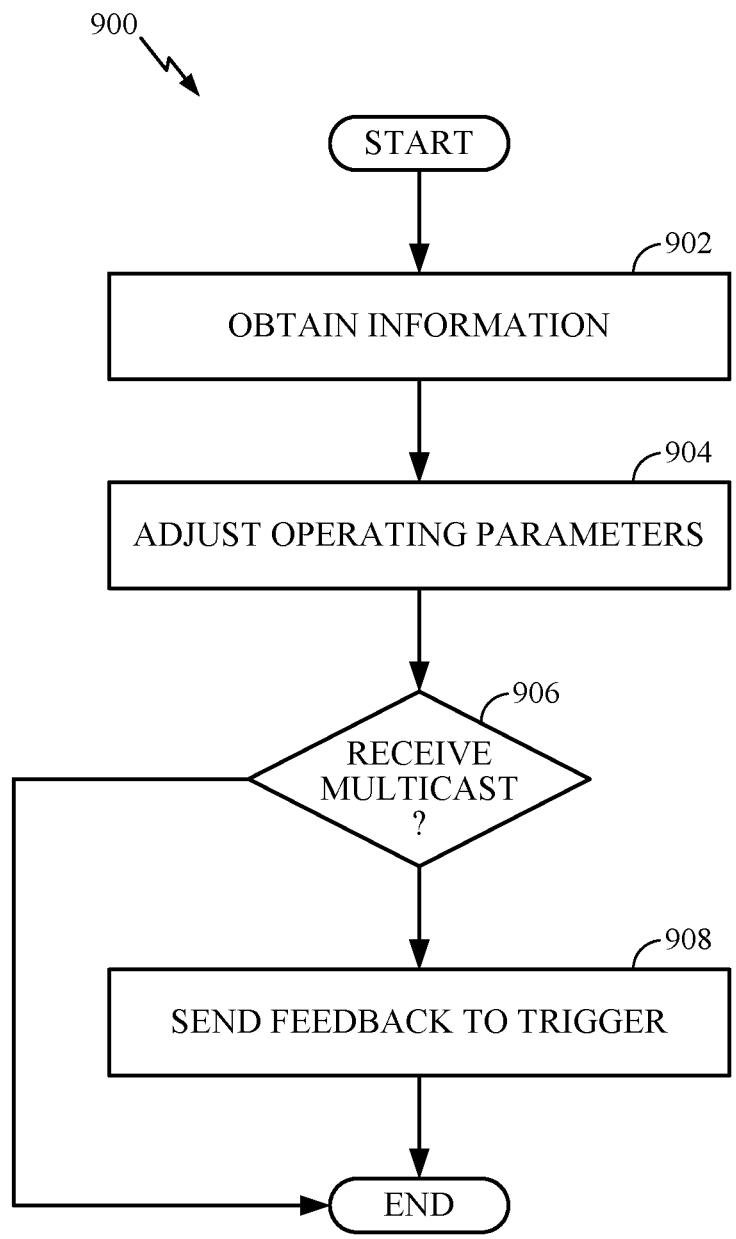
FIG. 9 is a flow diagram illustrating example operations for wireless communications of a V2X, in accordance with certain aspects of the present disclosure.

Referring to FIG. 9, a method 900 for wireless communication by a first wireless device is illustrated. The first wireless device may be, for example, a vehicle equipped with a V2X communication system (or any device that enables V2X communications).

A first step of the method 900, at 902, provides for obtaining information regarding an environment for wireless communications between the first wireless device and at least one second wireless device. In an example, the first and second wireless device may be a vehicle equipped with a V2X communication system. The information that is obtained at 902 may comprise at least one of: speed and location of the first wireless device, speed and location of the second wireless device, or relative speed between the first and second wireless devices. The information may provide an indication of the pattern of interferers or mobility of receivers. This information may be obtained shared between services by the vehicle.

At 904, the first wireless device adjusts one or more operating parameters for the wireless communications, based on the information. The operating parameters may be for a group of transmissions. Therefore, the operating parameters may change based on the determined information from step 902.

The operating parameters adjusted at 904 may comprise a modulation and coding scheme (MCS). In other embodiments, the information may be a target data rate, target link budget, and speed. In still other aspects, the adjusting may be selecting a combination of MCS, a reference signal (RS)

pattern, and a multiple input multiple output (MIMO) mode, based on the target data rate, target link budget, and speed. According to aspects, a MIMO mode may be selected for the transmission. In an example, MIMO may be selected when channel scattering is rich and SNR is high (e.g., closer range). When scatter is low (not enough) or which the range is large, transmit diversity technique (small cyclic delay diversity (SCDD), space frequency block codes (SFBC), space-time block codes (STBC)) may be used instead of MIMO. Regardless, the operating parameters are associated with a different service than the service from which information was obtained at step 902.

According to aspects, a beamforming transmission mode or a spatial multiplexing mode is selected based on a distance between the first and second wireless devices. Beamforming may be used for unicast transmissions targeting long distances.

In some cases, the method may continue, at 906, with deciding (e.g., based on location and movement information obtained at 902), to receive certain multicast information. If the decision is to receive the certain multicast information, at 908, the wireless device may send feedback to trigger transmission (or retransmission) of the certain multicast information. The multicast information may include device-to-device (D2D) or V2X communication. The feedback may be, for example, a negative acknowledgment (NACK) if the device was not able to successfully decode an initial transmission of the multicast information. In this manner, although a source transmitting the multicast information may not initially be aware of the device, the feedback makes the source aware and triggers retransmission.

Figure 10:
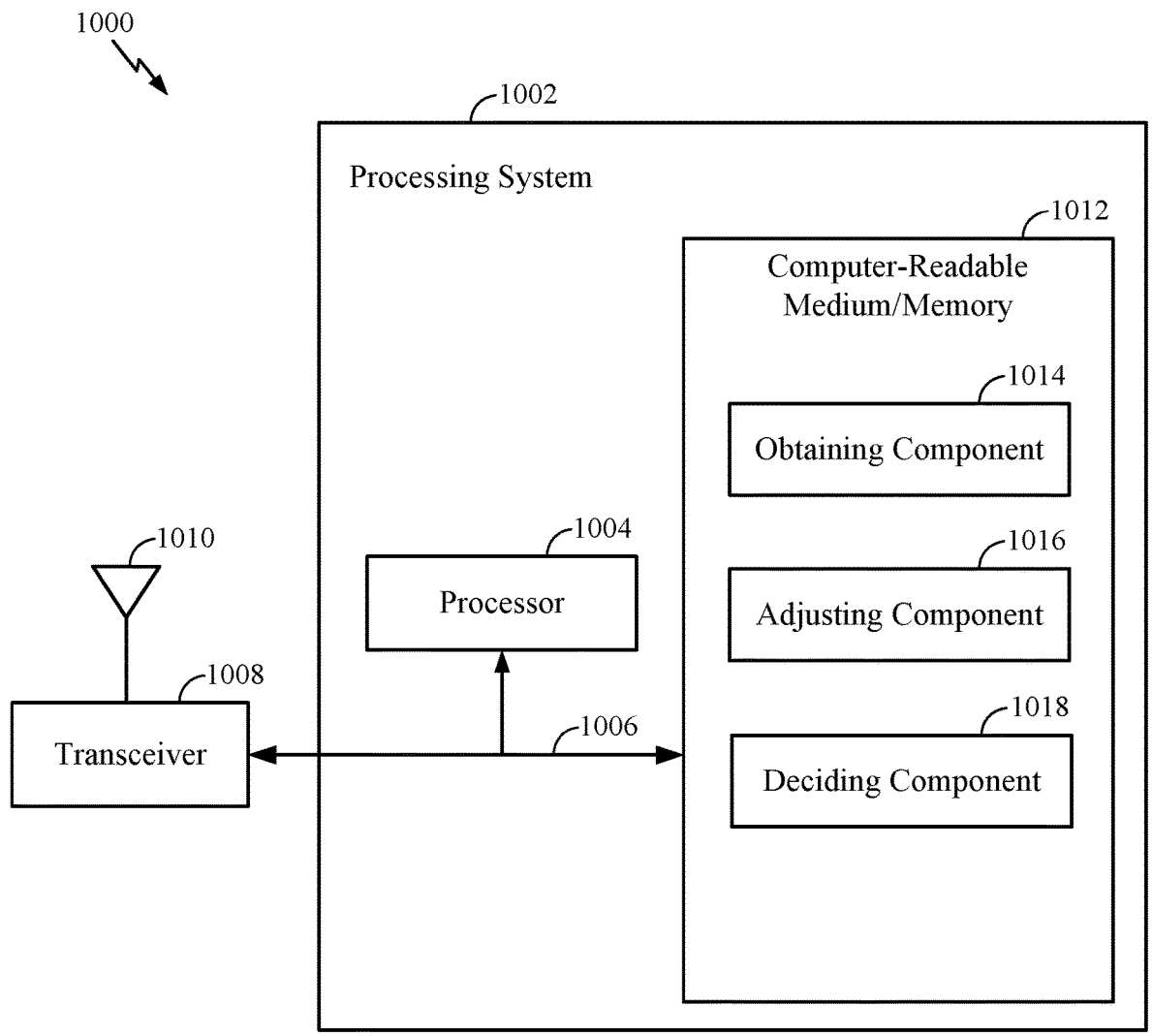
FIG. 10 illustrates an example communication device that may include various components configured to perform operations for the techniques disclosed herein, in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 10 and other aspects described herein and illustrated in the drawings. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 9, or other operations for performing the various techniques discussed herein for inter-service sharing of information. In certain aspects, computer-readable medium/memory 1012 stores code 1014 for obtaining information regarding an environment, code 1016 for adjusting parameters for a second service based on information received in a first service, and optionally code 1018 for deciding based on information known the vehicle whether to receive multicast information or other V2X transmissions.

In certain aspects, the processor 1004 has circuitry configured to implement the code stored in the computer-readable medium/memory 1012. The processor 1004 includes circuitry (not illustrated) similar to the code 1014, 1016, and 1018.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a first wireless device, comprising:
 obtaining information regarding an environment for wireless communications between the first wireless device and at least one second wireless device, wherein the information comprises a target data rate, target link budget, and speed, wherein the information is obtained via an inter-service exchange of information between different layers of the first wireless device; and
 adjusting one or more operating parameters for the wireless communications, based on the information, wherein adjusting the one or more operating parameters comprises selecting a combination of modulation and coding scheme (MCS), a reference signal (RS) pattern, and a multiple input multiple output (MIMO) mode, based on the target data rate, the target link budget, and the speed.

2. The method of claim 1, wherein the adjusting is also based on a capability of at least one of the first wireless device and the second wireless device.

3. The method of claim 1, wherein the information comprises at least one of: speed and location of the first wireless device, speed and location of the second wireless device, or relative speed between the first and second wireless devices.

4. The method of claim 1, wherein the adjusting comprises adjusting an amount of resources used for RS transmissions.

5. The method of claim 4, wherein the adjusting comprises:
   selecting an RS pattern, from a set of RS patterns, based on the MCS and relative speed between the first and second wireless devices.

6. The method of claim 1, wherein the adjusting comprises selecting the MIMO mode based on the information.

7. The method of claim 6, wherein the selecting comprises selecting a beamforming transmission mode or a spatial multiplexing mode, based on a distance between the first and second wireless devices.

8. The method of claim 1, further comprising:
   deciding, based on location and movement information, to receive certain multicast information; and
   sending feedback to the at least one second wireless device to trigger retransmission of the certain multicast information.

9. The method of claim 1, further comprising receiving network signaling that limits options available for the adjusting.

10. The method of claim 9, wherein the network signaling indicates limited options for RS patterns.

11. The method of claim 10, wherein the signaling indicates:
    a first set of one or more RS patterns to use in a first scenario; and
    a second set of one or more RS patterns to use in a second scenario.

12. An apparatus for wireless communications by a first wireless device, comprising at least one processor and a memory coupled to the at least one processor, wherein the processor is configured to:
    obtain information regarding an environment for wireless communications between the first wireless device and at least one second wireless device, wherein the information comprises a target data rate, target link budget, and speed, wherein the information is obtained via an inter-service exchange of information between different layers of the first wireless device; and
    adjust one or more operating parameters for the wireless communications, based on the information, wherein adjusting the one or more operating parameters comprises selecting a combination of modulation and coding scheme (MCS), a reference signal (RS) pattern, and a multiple input multiple output (MIMO) mode, based on the target data rate, the target link budget, and the speed.

13. The apparatus of claim 12, wherein the at least one processor is configured to adjust the one or more operating parameters further based on a capability of at least one of the first wireless device and the second wireless device.

14. The apparatus of claim 12, wherein the information comprises at least one of: speed and location of the first wireless device, speed and location of the second wireless device, or relative speed between the first and second wireless devices.

15. The apparatus of claim 12, wherein the at least one processor is configured to adjust the one or more operating parameters by adjusting an amount of resources used for RS transmissions.

16. The apparatus of claim 15, wherein the at least one processor is configured to adjust the one or more operating parameters by selecting an RS pattern, from a set of RS patterns, based on the MCS and relative speed between the first and second wireless devices.

17. The apparatus of claim 12, wherein the at least one processor is configured to adjust the one or more operating parameters by selecting the MIMO mode based on the information.

18. The apparatus of claim 17, wherein the selecting comprises selecting a beamforming transmission mode or a spatial multiplexing mode, based on a distance between the first and second wireless devices.

19. The apparatus of claim 12, wherein the at least one processor is further configured to:
    decide, based on location and movement information, to receive certain multicast information; and
    send feedback to the at least one second wireless device to trigger retransmission of the certain multicast information.

20. The apparatus of claim 12, wherein the at least one processor is further configured to receive network signaling that limits options available for the adjusting.

21. The apparatus of claim 20, wherein the network signaling indicates limited options for RS patterns.

22. The apparatus of claim 21, wherein the signaling indicates:
    a first set of one or more RS patterns to use in a first scenario; and
    a second set of one or more RS patterns to use in a second scenario.

23. An apparatus for wireless communications by a first wireless device, comprising:
    means for obtaining information regarding an environment for wireless communications between the first wireless device and at least one second wireless device, wherein the information comprises a target data rate, target link budget, and speed, wherein the information is obtained via an inter-service exchange of information between different layers of the first wireless device; and
    means for adjusting one or more operating parameters for the wireless communications, based on the information, wherein the means for adjusting the one or more operating parameters comprise means for selecting a combination of modulation and coding scheme (MCS), a reference signal (RS) pattern, and a multiple input multiple output (MIMO) mode, based on the target data rate, the target link budget, and the speed.

24. A non-transitory computer-readable medium for wireless communications by a first wireless device having instructions stored thereon which, when executed by a processor, cause the first wireless device to:
    obtain information regarding an environment for wireless communications between the first wireless device and at least one second wireless device, wherein the information comprises a target data rate, target link budget, and speed, wherein the information is obtained via an inter-service exchange of information between different layers of the first wireless device; and
    adjust one or more operating parameters for the wireless communications, based on the information, wherein the instructions that cause the first wireless to adjust the one or more operating parameters comprise instructions that cause the first wireless device to select a combination of modulation and coding scheme (MCS), a reference signal (RS) pattern, and a multiple input multiple output (MIMO) mode, based on the target data rate, the target link budget, and the speed.

* * * * *